June 1, 1926.
J. D. PETERSEN
PRESSURE GAUGE
Filed Feb. 1, 1926
1,586,695
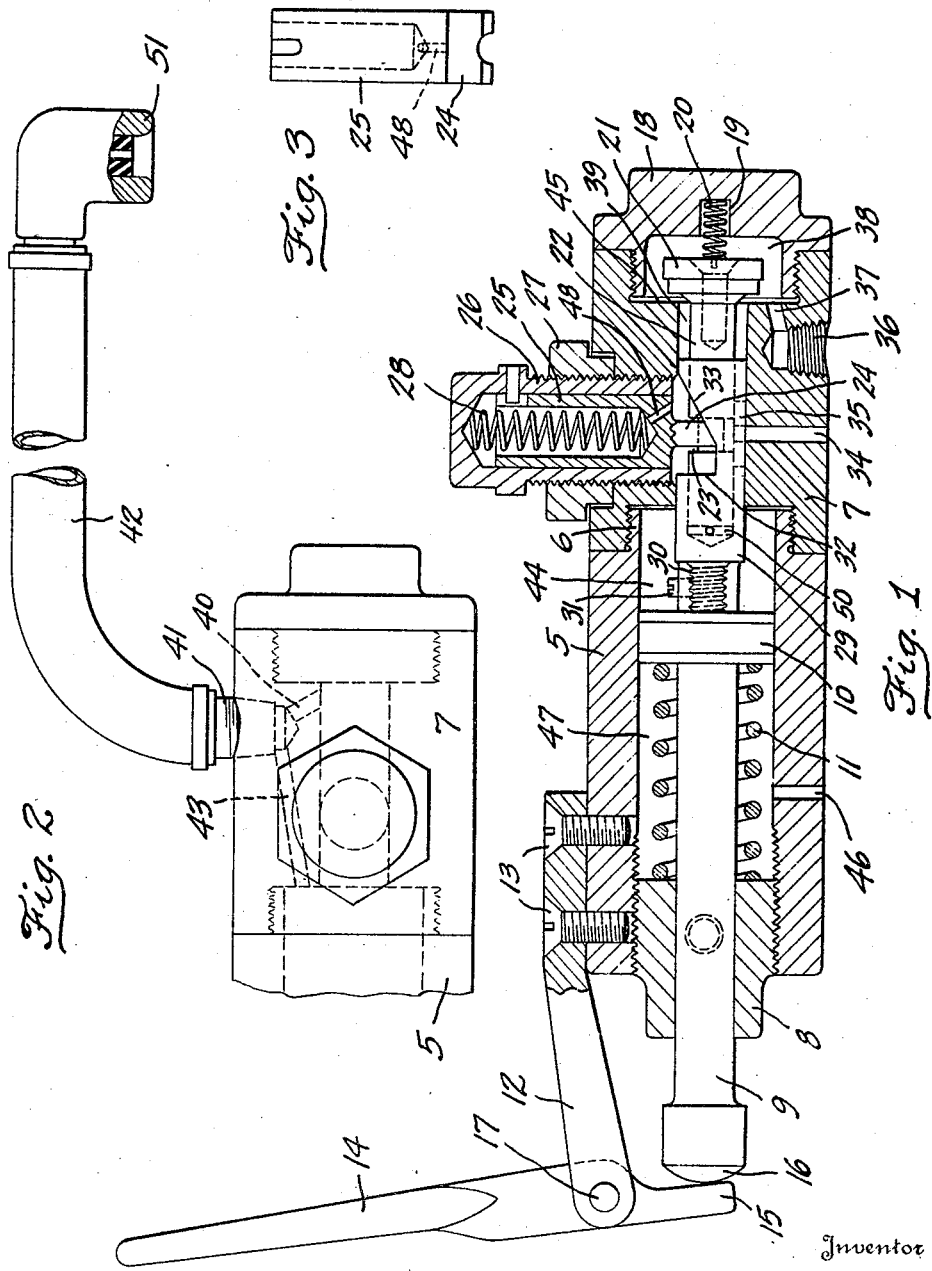
Inventor
JOHN D. PETERSEN
By  J. King Harness
Attorney Patented June 1, 1926.

1,586,695

UNITED STATES PATENT OFFICE.

JOHN D. PETERSEN, OF DETROIT, MICHIGAN.

PRESSURE GAUGE.

Application filed February 1, 1926. Serial No. 85,324.

It is the primary object of my invention to provide a pressure gauge of cheap and economical construction adapted for many uses but particularly for gauging the air passed into an inflatable tire such as is used on automobiles and adapted to shut off the air passage to such tire when a predetermined pressure has been attained.

With the above and other objects in view, my invention consists in the arrangement, combination and construction of the various parts of my improved device as described in the specification, claimed in my claims and shown in the accompanying drawing, in which:—

Fig. 1 is a central sectional view showing my improved device.

Fig. 2 is a detailed end view of one end of the same, showing the connection leading therefrom by which a tire may be inflated.

Fig. 3 is a detailed view of the plunger utilized in my device.

I have shown a casing 5 having a reduced screw threaded end 6 on which a casing 7 is screwed. The casing 5 is provided with interior screw threads at one end thereof into which a plug 8 is screwed. A rod 9 extends through the plug 8 and is provided with a piston 10 on its enclosed end. A coiled spring 11 is positioned around the rod 9 between the inside face of the plug 8 and one end of the piston 10. An arm 12 is positioned on the casing 5 by means of screws 13 and a lever 14 having an end 15 bearing against the end 16 of the rod 9, is pivoted to the arm as at 17.

A plug 18 is screwed into the other end of the casing 7 and is provided with a recess 19 within which a coiled spring 20 is seated. The spring 20 extends from the recess 19 and bears against the head 21 on the rod 22. The rod 22 is provided with a notch 23 in which the end 24 of an apertured plunger 25 seats.

A fitting 26 is screwed into the casing 5 directly over the notch 23 and a nut 27 is screwed on the fitting 26 outside the casing 5. The fitting 26 is apertured to receive the plunger 25 and a coiled spring 28 is provided within the plunger 25 bearing at one end against the bottom of the aperture in the plunger and at the other end against the top of the fitting 26.

A tubular member 29 is screwed on to the piston 10 as at 30 and a pin 31 is provided for locking the same in place. The tubular member 29 encloses the rod 22 and is provided intermediate its ends with a cut out section or slot having a straight side 32 nearest the piston 10 and an angular side 33 nearest the head 21. The end 24 of the plunger 25 is diagonally cut to fit on the side 33 of the slot in the tubular member 29. A pin 34 extends through the casing 7 into a slot 35 in the tubular member 29 to permit of longitudinal movement of the tubular member but prevent rotation thereof.

A screw threaded opening 36 is provided in the casing 7 to which a hose or other suitable conductor of air or fluid leading from a source of supply may be attached and a passage 37 is provided leading from the opening 36 to the chamber 38 within the casing 7. When air or other material is passed from a source of supply through the opening 36 and passage 37 into the chamber 38, it will pass around the head 21 through the passage 39 between the rod 22 and the inside of the casing 7 and thence through the passage 40, the fitting 41 extended into the casing 7, and hose 42 to the nozzle 51 which is adapted to be attached to a tire air valve or other suitable receiver. A passage 43 also connects with the fitting 41 and the passage 40 and extends to the chamber 44 within the casing 5 so as to assert force upon the piston 10. As the pressure in the tire or other receptacle builds up, pressure likewise builds up in the chamber 44 and tends to move the piston 10 against the pressure of the spring 11. This movement carries the tubular member 29 and as the tubular member 29 moves, the end 24 of the plunger 25 is moved upwardly by the action of the diagonal side 33 of the groove or slot in the tubular member 29. This action continues until the plunger 25 has been raised to a point where the end 24 clears the slot 23 in the rod 22 at which time pressure in the chamber 38 will snap the head 21 to seat against the shoulder 45 on the casing 7 and close the passage 40 with respect to the chamber 38. The spring 20 is provided to assist in snapping the head 21 to its seat. This spring is not necessary in many constructions but may be found desirable for certain purposes. The springs 28 and 11 are, of course, proportioned to exert a predetermined pressure and require a predetermined pressure of air or other like substance to move them. A vent 46 is provided in the casing 5 to prevent imprisoning air in the space 47 between the plug 8 and the piston 10 and a similar vent 48 is provided in the plunger 25 so as to equalize pressures within the plunger with those at its lower end.

After the piston 10 has been moved to a position where the head 21 is permitted to come to its seat and prevent the further passage of air through the hose 42, the hose 42 is moved and connected to another tire or other similar object so as to repeat the process. At the same time the lever 14 is moved on its pivot to return the rod 9 and piston 10 back to the position shown in Fig. 1, which movement pushes the rod 22 and its head 21 by reason of engagement of the rod 22 in the end of the tubular member 29 as at 50 so as to reopen the passage from the chamber 38 to the space 39 and passage 40.

It will be apparent that I have provided an economical and well constructed device for the purpose it is to serve and that the passage of air to the receptacle to be filled is constant until air passage is shut off. That is to say, if the pressure in the receptacle nears its shutting off point the passage of air leading to it is not diminished but is continued until such predetermined pressure is obtained when the air is consequently shut off by the snapping to of the head 21.

It will be obvious various changes may be made in the arrangement, combination and construction of the various parts of my improved device without departing from the spirit of my invention, and it is my intention to cover by my claims such changes as may be reasonably included within the scope thereof.

What I claim is:—

1. In combination, a housing, an air inlet and an air outlet in said housing, a passage connecting the inlet and outlet, a valve seat in the passage, a valve adapted when seated to close the passage and when unseated to open it, a stem on said valve, a slot in the stem, a sleeve enclosing the stem, an opening in said sleeve over said slot, a plunger extended into said opening and slot, one side of said opening being diagonally cut, and means for moving said sleeve as pressure in the passage is built up, to raise said plunger along said diagonal side, and thereby clear the plunger of the groove and permit movement of the valve and valve stem.

2. In combination, a housing having an air inlet and an air outlet therein, a passage connecting the openings, a resiliently held piston in the housing in communication with the passage and adapted to be moved by pressure built up therein, a sleeve connected to the piston, a valve stem in the sleeve, aligned slots in the stem, and sleeve, one side of the latter being diagonally cut, a resiliently pressed plunger extended in the slots and adapted to travel along said diagonal side of the sleeve slot when the sleeve and piston are moved, a valve seat in said passage and a valve mounted on the valve stem normally held in unseated position by the plunger in the stem slot, and adapted to snap to seated position to close the passage against further entry of air when said plunger has been moved by said sleeve to clear the stem slot.

3. A construction as set forth in claim 4 wherein a stem is attached to said piston, extending outside the housing, and a lever is positioned on the housing, adapted on actuation to return the piston after the latter has been moved outwardly and permit re-entry of the plunger into the stem slot.

4. In combination, a tubular member having a plug screwed in one end thereof, a coiled spring and a piston in the member, said spring being held between the inside of the plug and one side of the piston, a member screwed on the other side of the piston and having a longitudinally extending aperture therein forming a sleeve, a valve stem extended into the sleeve, aligned slots in the stem and sleeve, one side of the latter being diagonally cut, a second tubular member screwed on the free end of the first tubular member and enclosing portions of said sleeve and stem, a plunger housing screwed into said second tubular member, a plunger in said housing, a spring in the housing pressing one end of the plunger into said aligned grooves, a cap screwed on the free end of said second tubular member and having a hollowed out portion therein, air inlet and air outlet portions in said second tubular member, a passage connecting the inlet and outlet extending through the hollowed out portion of the cap, a valve on said stem in said hollowed out portion, and a valve seat in the passage, whereby pressure built up in the passage will move said piston and its sleeve, to raise said plunger clear of the stem slot and permit said valve to snap to its seat and thereby prevent further entry of air to the air outlet.

JOHN D. PETERSEN.